J. D. RICHARDS.

Projectile.

No. 3,886. Reissued March 22, 1870.

Witnesses:
Villette Anderson.
Chas. Kenyon.

Inventor:
Jno. D. Richards.
Chipman Hosmer & Co.
Attorneys.

N. PETERS. Photo-Lithographer. Washington, D. C.

UNITED STATES PATENT OFFICE.

JOHN D. RICHARDS, OF MUSCATINE, IOWA.

IMPROVEMENT IN PROJECTILES.

Specification forming part of Letters Patent No. 96,647, dated September 7, 1869; Reissue No. 3,886, dated March 22, 1870.

*To all whom it may concern:*

Be it known that I, JOHN D. RICHARDS, of Muscatine, in the county of Muscatine and State of Iowa, have invented a new and valuable Improvement in Projectiles; and I do hereby declare the following to be a full, clear, and exact description of the construction and operation of the same, reference being had to the annexed drawings, making a part of this specification, and to the letters and figures of reference marked thereon.

Figure 1:
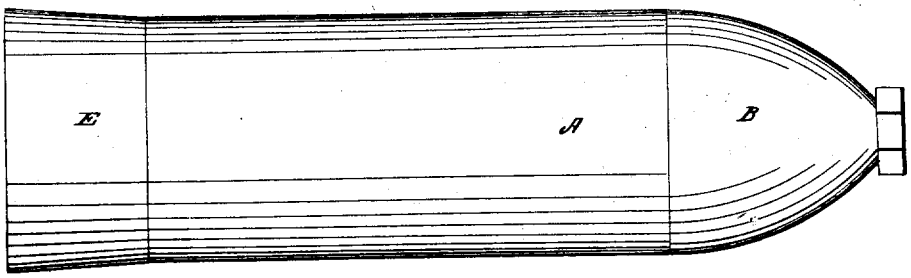
Figure 2:
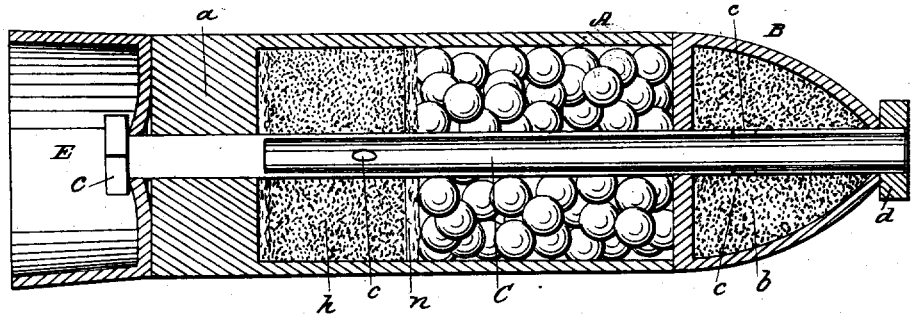

Figure 1 of the drawings is an external view of my projectile. Fig. 2 is a longitudinal central section of the same.

My invention relates to rifle-shell; and it consists, mainly, in forming the body of the shell in two sections, secured together by a hollow bolt, which at the same time serves to communicate the fire from the fuse to the bursting-charges.

The letter A of the drawings designates the main portion or cylinder of my shell, and B represents a hollow cap secured to the forward end of the cylinder A by means of the hollow bolt C. The rear end of the cylinder A is closed by a thick base-wall, *a*, and the forward end is open. The hollow bolt C passes through the base of the shell forward to the point thereof. Its solid head is lettered *c*; and *d* represents a nut upon the forward end thereof, which is open to receive the fuse. Perforations *c c* are made in the wall of the bolt where it passes through the powder charges.

Secured to the base of the shell is a cup, E, of lead or wrought-iron, having its hollow turned toward the rear, and operating to fill the grooves of the base when the piece is discharged, and thus to impart the necessary rotary motion to the shell to keep it point foremost. The cavity of the hollow cap B is filled with powder at *b*. A layer of oakum is placed in the base of the chamber of the cylinder A, and on it a charge of powder, *h*. Another layer of oakum, *n*, is laid over the powder, and on this the charge of grape or canister, which occupies all the intervening space between the oakum and the base of the cap.

My shell is designed to be discharged from a rifled gun, and is usually operated with a time-fuse, although a percussion-fuse may be employed therewith. The fuse at the proper time in the flight of the shell having ignited the priming in the hollow tube C, the cap B is exploded, performing the office of a small shell, and clearing the way for the grape or canister, discharged almost immediately afterward by the ignition of the charge of powder *h* in the cylinder A. Thus I obtain all the advantage of a discharge of grape or canister from a short-range howitzer with the long range of the rifle-shell.

What I claim as my invention, and desire to secure by Letters Patent, is—

The projectile herein described, having cylinder A, hollow cap B, cup E, and hollow perforated bolt C, when constructed and arranged to operate substantially as specified.

In testimony that I claim the above I have hereunto subscribed my name in the presence of two witnesses.

JOHN D. RICHARDS.

Witnesses:

H. N. P. SMALL,

J. H. THOMPSON.